GUY GAUDFRIN
INVENTOR.

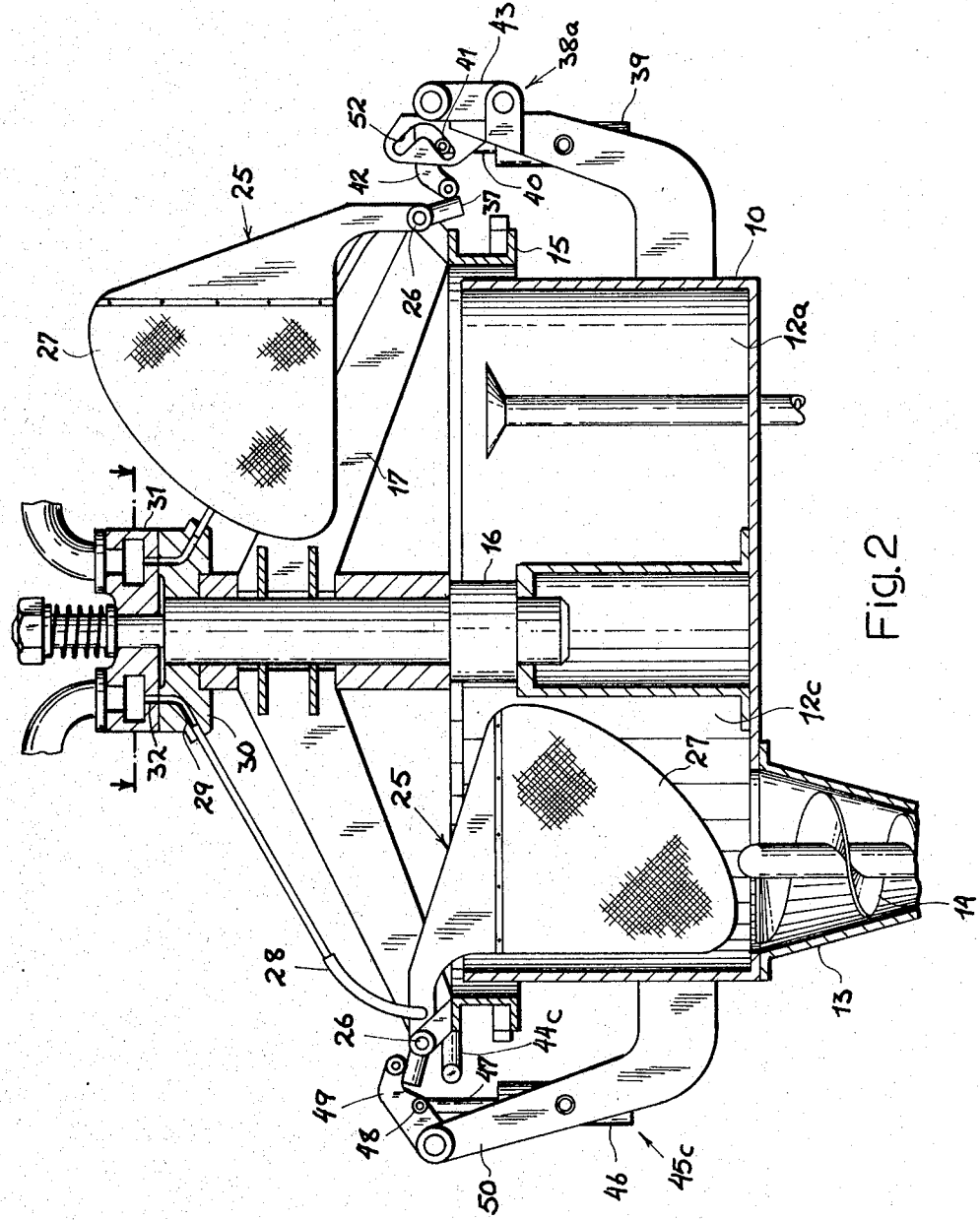

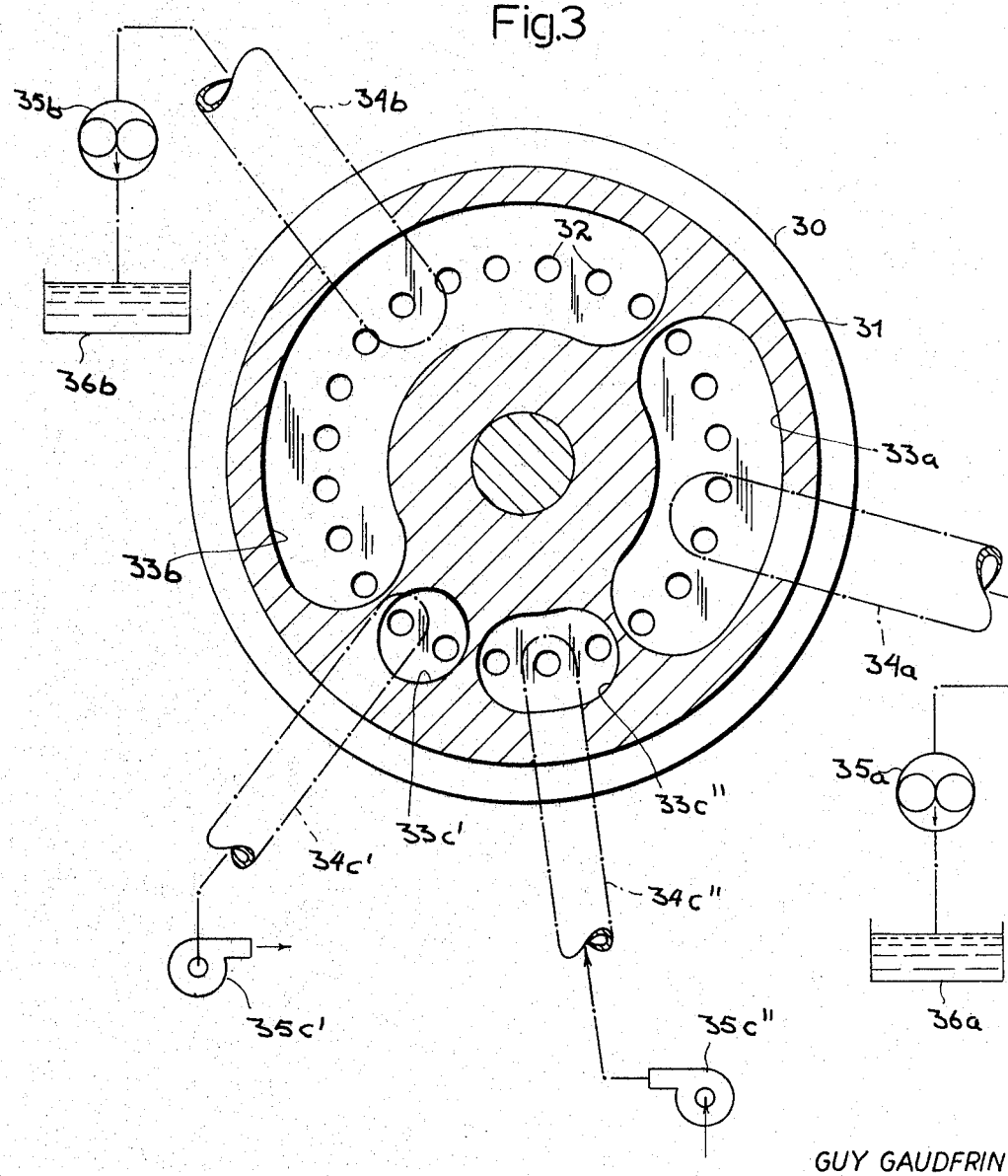

United States Patent Office 3,298,524
Patented Jan. 17, 1967

3,298,524
ROTARY FILTER HAVING PIVOTING
FILTER ELEMENTS
Guy Gaudfrin, 1 Rue Lord Byron, Paris, France
Filed July 15, 1964, Ser. No. 382,766
Claims priority, application France, July 16, 1963,
941,633
20 Claims. (Cl. 210—138)

My present invention relates to an apparatus for the treatment of liquids in order to separate suspended or dissolved substances therefrom. Thus, the invention is particularly applicable to the filtering of juices and other fluids with the aid of mechanical screens, as well as the desalting of water and the removal of metal and other ions by ion-exchange resins. An apparatus of this nature, useful as a thickener for the juices of sugar refineries and the like, has been described in U.S. Patent No. 3,056,504 issued 2 October 1962 to Paul Lavallée.

The main object of my invention is to provide an improved apparatus of this type which is continuously operable to carry out the desired separation of solutes or suspended solids from a liquid in a succession of stages in which the treatment media (e.g. filter screens or ion-exchange membranes) are traversed by different fluids which should not be intermingled in the output of the apparatus and which in fact may be incompatible with one another. Thus, the invention is to permit the alternate use of the same treatment medium with different solutions, and/or the successive penetration of such medium by active liquids and inert fluids such as, for example, rinse water and drying air, in a single repetitive operating cycle.

It is also an object of my invention to provide an improved filtering element for such apparatus designed to afford a more intensive extraction of residual liquid from the solids deposited thereon.

A further object is the provision of an apparatus of this type in which a considerably increased number of filtering elements or similar carriers are fitted into a given container for liquid to be treated.

In accordance with a feature of the invention there is provided a central, preferably bowl-shaped vessel with at least one upwardly open compartment for the liquid to be treated, in combination with an array of carriers for the treatment medium (e.g. a filter screen or an ion-exchange membrane) having the shape of substantially flat vertical vanes swingable in substantially radial planes, each carrier being formed with a chamber communicating at least intermittently with a source of reduced pressure whereby treatment liquid or other fluid (e.g. air) is drawn through the treatment medium which advantageously has the form of a pair of liquid-permeable sheets. These vanes are supported on an annular mount surrounding the vessel, this mount together with its carriers being progressively rotated while a control mechanism lifts each carrier out of the vessel as it approaches the end of the compartment containing the liquid to be treated, the carrier being subsequently lowered again into the vessel upon returning to this compartment. Where the vessel contains more than one compartment filled with liquid, each carrier is raised and lowered as it passes a partition separating these compartments from one another. It is also possible to use one such compartment as a receptacle for solids accumulated on the filter screen or screens of each carrier in its passage through a liquid to be filtered, the carrier being then held elevated above the receptacle for purposes of drying and being preferably subjected to jolting to help dislodge the filter cake from the screen. Alternately or simultaneously, the suction applied to the chamber of the filter carrier may be reversed to assist in the separation of the solids from the filter screen. If the vane is swingable through an angle of approximately 180°, the receptacle for the solids may also be positioned outside the annular mount.

The raising and lowering of each vane is best carried out with the aid of an actuator, engageable with an outwardly projecting spur of the carrier, and with a shock absorber subsequently intercepting this spur so as to cushion the return of the vane to its lowered position within the vessel. Between the raising and lowering stations there is advantageously provided a ramp engaging the spur to hold the vane withdrawn. The actuator may be a hydraulic jack and may be synchronized with a hydraulic piston serving to step the mount periodically through an annular distance equal to the pitch of the arrays, i.e. to a distance corresponding to the center-to-center spacing of adjacent vanes.

Particularly in the case of filtering devices the carriers, pursuant to another feature of my invention, may each consist of two complementary pan-shaped portions with confronting concave sides spanned by respective filter screens, a biasing spring or the like urging the two relatively movable portions apart until the space existing between the two screens is occupied by sufficient accumulation of solids to seal off the suction chambers of these portions from the surrounding atmosphere. When this occurs, the resulting pressure differential forces the two screens together against the biasing force, thereby squeezing the residual liquid from the intervening solids. When the pressure differential is subsequently removed, the two portions are again moved apart and the compressed filter cake is released from the carrier.

If the filter screens are replaced by ion-exchange membranes, no solids will accumulate but the operation is otherwise similar. In particular, the apparatus may then be used in such manner that each carrier is dipped first into a solution to be treated and is thereafter immersed in a regenerating liquid for restoring the ion-exchanging action of the membranes, the two liquids being held separated in different sectoral compartments of the treatment vessel.

Embodiments of the invention will now be described with reference to the accompanying drawing in which:

FIG. 2 is a cross-sectional view taken substantially on the line II—II of FIG. 1;

FIG. 3 is in part an enlarged sectional view taken on the line III—III of FIG. 2 and in part a diagrammatic view of associated elements.

Figure 1:
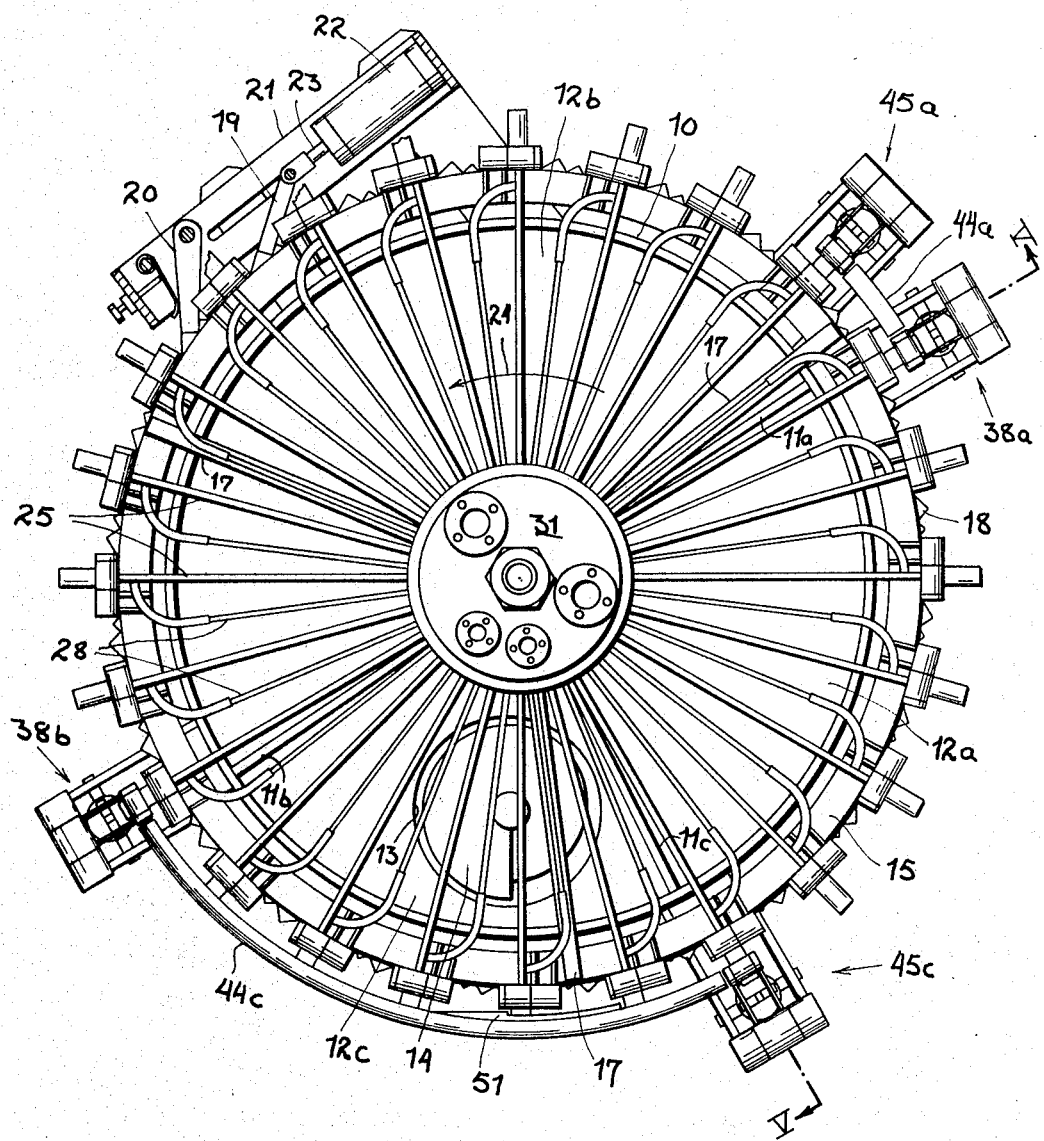
FIG. 1 is a top plan view of an apparatus according to the invention.

Reference will first be made to FIGS. 1-3. A bowl-shaped vessel 10 is divided by partitions 11a, 11b, 11c into three sectoral compartments 12a, 12b, 12c of which the first one contains a liquid to be treated, the second one contains a supply of washing water and the third one is empty. This third compartment 12c is shown provided with an outlet 13 containing a continuously rotating screw conveyor 14 for delivering recovered filtrate to a receptacle not shown.

An annular mount 15 surrounds the vessel 10 and is rotatably supported on a central boss 16 by radially extending ribs 17. Ring 15 is provided with an array of peripheral teeth 18 forming notches engageable by a driving pawl 19 and a holding pawl 20 on a support 21, this support carrying a cylinder 22 in which a piston 23 is hydraulically reciprocable; pawl 19 is hinged to this piston so as to advance the ring 15 in the direction of arrow 24 through an arc corresponding to the spacing of the notches between successive pairs of teeth 18. This spacing also corresponds to the pitch of an array of vane-shaped filter elements 25 which are pivoted at 26 to the ring 15 and which in essence consist of a frame structure covered on its faces by screens of filter cloth 27. The narrow chamber formed inside each vane 25 is connected via a flexible conduit 28 to a respective port 29 in a distributor head 30 which rotates with the structure 15, 17 about the boss 16. A fixed distributor cap 31 on boss 16 has ports 32 registering intermittently with the ports 29 of head 30, segmental voids 33a, 33b, 33c′, 33c″ connecting these ports with respective pipes 34a, 34b, 34c′, 34c″ in such manner that all the vanes in the region of compartments 12a, 12b and 12c communicate, respectively, with pipe 34a, pipe 34b and pipes 34c′, 34c″. Pipe 34a leads to a suction pump 35a which discharges into a vessel 36a; pipe 34b similarly leads to a suction pump 35b discharging into a vessel 36b; pipe 34c′ leads to an air aspirator 35c′ discharging into the atmosphere; and pipe 34c″ leads to an air blower 35c″.

Each of the filter elements 25 is provided with an outwardly extending integral spur 37 engageable at certain locations, i.e. just ahead of partitions 11a and 11b, by an actuator 38a or 38b comprising a hydraulic jack 39 whose ram 40 is articulated at 41 to a lever 42, the latter having one end pivoted to a swingable arm 43 and having its other end positioned to depress the spur 37 upon a retraction of ram 40 by the force of a hydraulic fluid whereby the filter sections 27 of element 25 are lifted from the vessel 10 as best seen on the right in FIG. 2. A short ramp 44a extends fixedly beyond actuator 38a to hold the spur 37 depressed while the carrier 25 passes over partition 11a. A similar ramp 44c extends alongside the entire compartment 12c to hold the elements 25 above vessel 10 until they have cleared the partition 11c. Just beyond partitions 11a and 11c there are disposed two shock absorbers 45a and 45c each comprising a dashpot 46 with a plunger 47 articulated at 48 to a lever 49; this lever has one end pivoted to a fixed arm 50 and has its other end positioned to intercept the rising spur 37 of a filtering element 25 as it drops into the vessel 10 after the spur has cleared the ramp 44a or 44c beyond partition 11a or 11c.

The dashpot 46 contains a spring, not shown, for lowering the lever 49 after it has released the spur 37 of a preceding element, preparatorily to interception of the spur of the next element.

The ramp 44c is formed with a jagged camming edge 51 in the region of outlet 13, the movement of a spur 37 past this camming edge jolting the associated vane 25 so that adhering filtrate is dislodged from the outer surface of its screen 27. This jolting action coincides with the application of air pressure from blower 35″ to the interior of the filtering element which further facilitates the detachment of the filter cake; the solids dropping into the outlet 13 are carried off by the conveyor 14.

Figure 6:
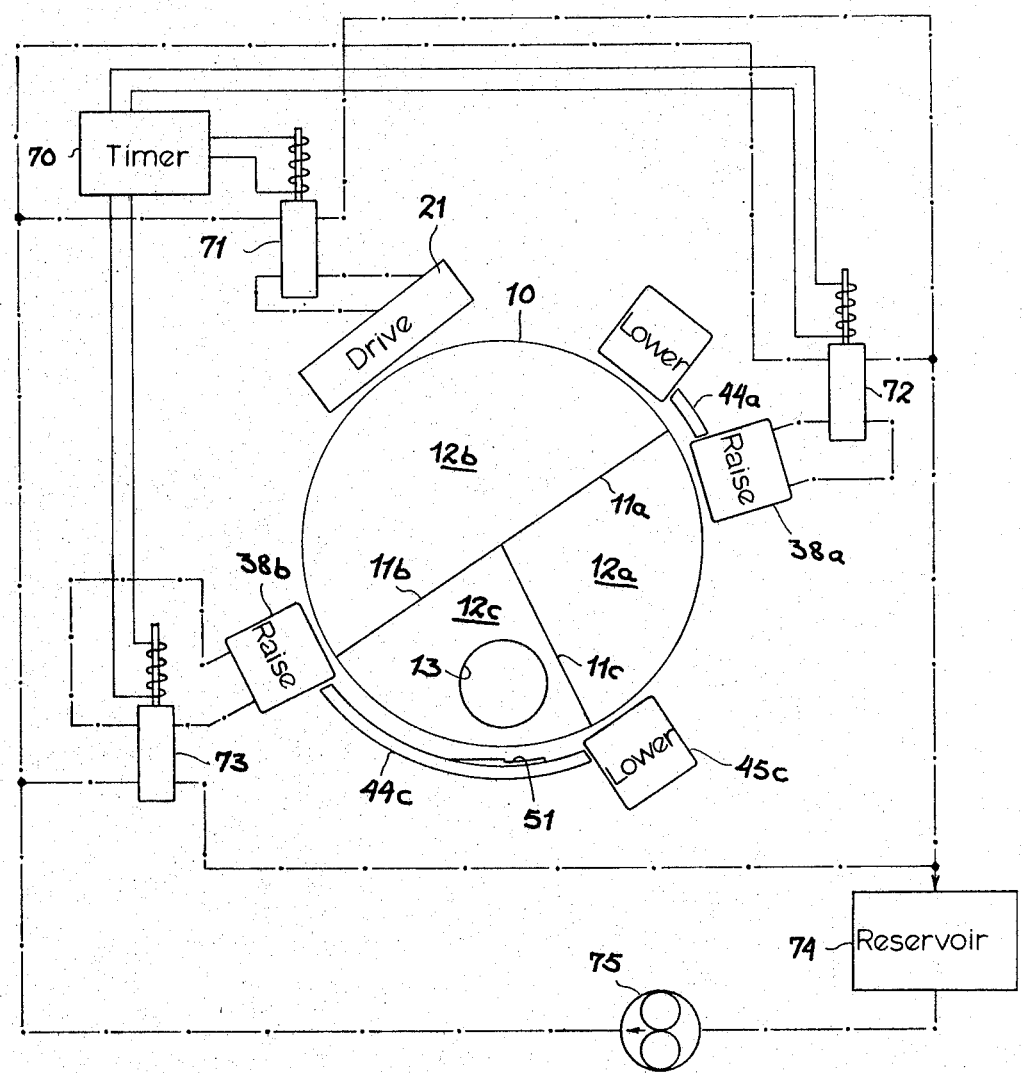
FIG. 6 is a diagrammatic view of the driving and vane-controlling mechanism of the apparatus.

In FIG. 6 I have indicated diagrammatically a hydraulic system for correlating the operation of the step-by-step carrier drive 21 with that of the actuators 38a, 38b. A timer 70 controls three solenoid valves 71, 72, 75 which in turn govern the admission of hydraulic liquid from a reservoir 74, by way of a pump 75, to the cylinder 22 of drive piston 23 (FIG. 1) and to the vane-raising jacks 39 of the two actuators. By this means, the operation of the feed-mechanism 19–23 is so synchronized with that of the actuators 38a, 38b that each vane 25 is lifted out of the vessel 10 as soon as its spur 37 has come to rest underneath the free end of lever 42. The hinge pin 41 of this lever is so guided in a slot 52 that the lever end always contracts the spur 37 at a fixed distance from its fulcrum 26.

In operation, compartment 12a may be filled with, for example, the raw juice of crushed beets or cane so that a heavy syrup is delivered by the pump 35a to the vessel 36a. Next, upon immersion of the filter in compartment 12b, the adhering solids are washed with water which also flushes the filter chamber and its conduit 28 so as to reach the vessel 36b via pump 35b in the form of a diluted liquor. Above compartment 12c, where the filters are held elevated by the ramp 44c, drying air passes through the screens 27 and the adhering filter cake until the air flow is reversed and the cake is dislodged as described above.

Figure 2A:
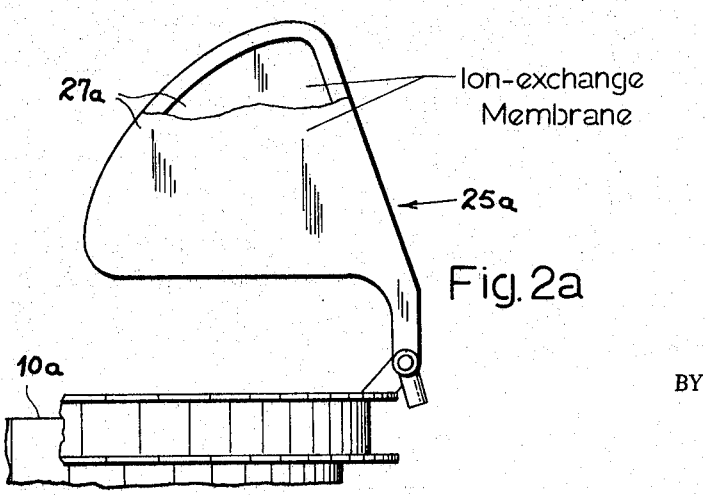
FIG. 2a illustrates a partial modification of the apparatus as seen in FIG. 2.

If the apparatus is to be used for the recovery of solutes by an ion-exchange process, the filter-type vanes 25 can be replaced by elements 25a, as shown in FIG. 2a, wherein permeable membranes 27a take the place of the filter screens 27, these membranes being coated or impregnated in known manner by a suitable ion-exchange resin. In this case the vessel 10a may have only two sector-shaped compartments, one containing the solution to be treated while the other is filled with a regenerative liquid, there being no need for a drying and discharging compartment such as the one shown at 12c in FIGS. 1 and 6.

Figure 4:
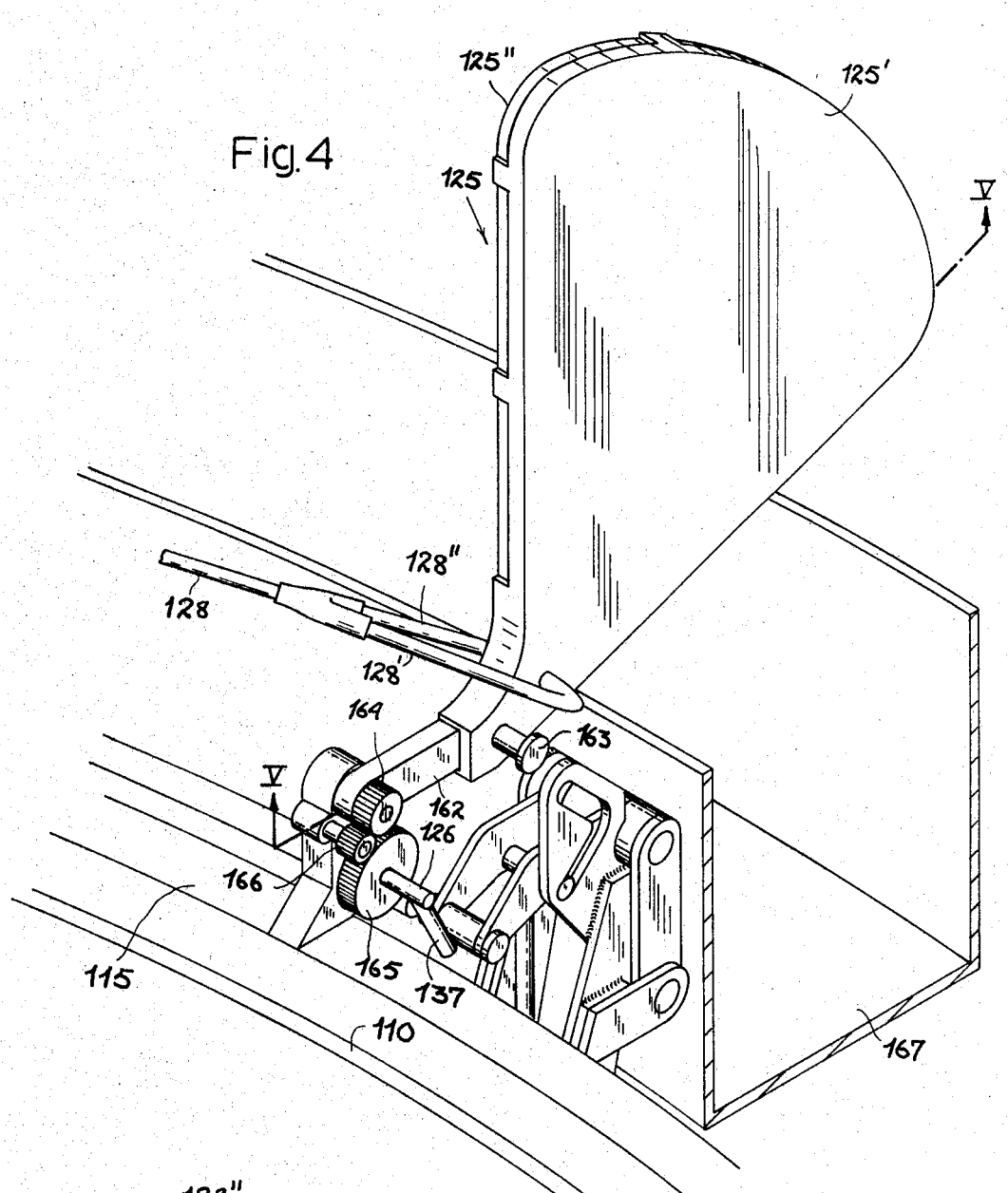
FIG. 4 is a fragmentary perspective view of a modified filter element.
Figure 5:
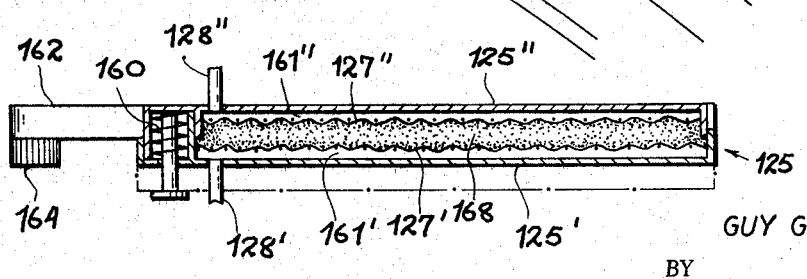
FIG. 5 is a sectional view taken on line V—V of FIG. 5.

In FIGS. 4 and 5 I have shown a modified filtering element 125 composed of two relatively slidable pan-shaped portions 125′ and 125″. Portion 125′ is slightly wider than portion 125″ so as to embrace the latter when the two are interfitted, a spring 160 tending to separate these portions so as to form a large space between their confronting filter screens 127′ and 127″. The filter chambers 161′, 161″ enclosed by these screens and by the solid pan portions are connected via flexible tubes 128′, 128″ with the common conduit 128.

Filter portion 125″ has an extension 162 which carries a stem 163 supporting the spring 160 and which is rigid with a gear 164 pivoted at 126 to the annular mount 115. Spur 137 is rigid with the shaft of a pinion 165 which drives the gear 164 through an idler gear 166, the transmission ratio between gears 165 and 164 being 2:1 whereby the filtering element 125 is swung through an arc of about 180° when the spur 137 moves through only 90°. A trough 167 outside ring 115 serves as a receptacle for solids dislodged from the filter.

The rim of filter portion 125′ is partly cut away to admit liquid into the space between screens 127′ and 127″ and to facilitate the dislodgment of filtrate. A filter cake 168 gradually builds up in that space while the two screens are held separated by the spring 160. The accumulation of the solids eventually isolates the chambers 161′, 161″ from the surrounding atmosphere so that the partial vacuum in these chambers draws the two screens together and compresses the filter cake 168 between them, thereby squeezing out the residual liquor which is carried off into the receptacle 36a or 36b (FIG. 3). When the pressure differential is subsequently reversed by the switchover from distributor chamber 33c′ to chamber 33c″, spring 160 again spreads the two portions 125′ and 125″ so that the filter cake 168 is released to drop into the trough 167. Naturally, the aforedescribed jolting action may also be used in this case; also the split filter 125 can be used with the arrangement shown in FIGS. 1–3.

It will be apparent that the described arrangement accommodates a considerably larger number of filters on other carrier elements in a vessel of given diameter as compared with conventional systems in which such filters are centrally supported. My invention is, however, not limited to the specific apparatus described and illustrated. Thus, for example, the split filtering element shown in FIGS. 4 and 5 could also be used, if desired, with apparatus wherein the immersion of the element into a liquid and its subsequent withdrawal therefrom are carried out by means other than those particularly disclosed herein.

I claim:

1. An apparatus for the drawing of fluids through a porous treatment medium, comprising a bowl-shaped vessel, partition means in said vessel dividing the interior thereof into a plurality of sectoral compartments including at least one compartment for holding a liquid to be treated, an annular mount surrounding said vessel, an array of carriers for said treatment medium having the shape of substantially flat vertical vanes pivotally supported on said mount at closely spaced locations about the periphery of said vessel, drive means for progressively rotating said mount with said carriers about said vessel, said carriers being individually swingable in substantially radial planes of said vessel between a first position of immersion in said vessel and a second position withdrawn from said vessel, control means for maintaining each carrier in said first position at least along said one compartment and for withdrawing each carrier into said second position at least in the region of said partition means, each of said carriers being provided with a chamber into which liquid from said vessel can enter by way of said treatment medium upon immersion in said one compartment, and fluid-circulation means communicating with the chamber of each carrier in at least certain positions thereof for removing the treated liquid therefrom.

2. An apparatus as defined in claim 1 wherein each of said carriers is provided with an outwardly projecting spur, said control means including at least one actuator engageable with said spur at a first station for withdrawing the carrier from said vessel, and retaining means engageable by said spur for maintaining said carrier withdrawn on its way to a second station at which said spur is released for reimmersion of the carrier into said vessel.

3. An apparatus as defined in claim 2 wherein said carriers are spaced about said vessel with uniform pitch and said drive means includes mechanism for periodically stepping said mount through an angular distance corresponding to said pitch, said actuator being coupled with said mechanism for operation upon each stepping.

4. An apparatus as defined in claim 3 wherein said mechanism comprises a reciprocable piston, pawl means linked with said piston, a source of high-pressure fluid for reciprocating said piston, and a set of peripheral teeth on said mount engageable by said pawl means.

5. An apparatus as defined in claim 2 wherein said actuator comprises a hydraulic jack and a source of high-pressure fluid for operating said jack.

6. An apparatus as defined in claim 2, further comprising shock-absorber means disposed at said second station for intercepting said spur and cushioning its return stroke upon reimmersion of the carrier.

7. An apparatus as defined in claim 1 wherein said treatment medium comprises at least one permeable sheet on said carrier.

8. An apparatus as defined in claim 7 wherein said sheet is a filter screen.

9. An apparatus as defined in claim 7 wherein said sheet is an ion-exchanging membrane.

10. An apparatus for the filtering of fluids, comprising a vessel with at least one upwardly open compartment for holding a liquid to be filtered, an annular mount surrounding said vessel, an array of filtering elements having the shape of substantially flat vertical vanes pivotally supported on said mount at closely spaced locations about the periphery of said vessel, drive means for progressively rotating said mount with said elements about said vessel, said elements being individually swingable in substantially radial planes of said vessel between a first position of immersion in said vessel and a second position withdrawn from said vessel, control means for maintaining each element in said first position along said compartment and for withdrawing each element into said second position in a region beyond said compartment, each of said elements being provided with at least one filter screen and a chamber into which liquid from said vessel can enter by way of said screen upon immersion in said compartment, and fluid-circulation means communicating with the chamber of each element in at least certain positions thereof for removing the treated liquid therefrom.

11. An apparatus as defined in claim 10 wherein each of said elements consists of two complementary and separable pan-shaped portions with confronting concave sides spanned by respective filter screens and forming two chambers having connections leading to said fluid-circulation means, said elements being provided with biasing means tending to separate said portions thereof whereby a space is created between said screens for the accumulation of filter cake, said fluid-circulation means being adapted to create a sufficient pressure differential between the interior of said chambers and the surrounding atmosphere, upon the insulation of said chambers from said atmosphere by the buildup of filter cake, for overcoming the force of said biasing means and squeezing said filter cake between said screens.

12. An apparatus as defined in claim 11 wherein said fluid-circulation means includes valve means for substantially eliminating said pressure differential at a location remote from said one compartment, thereby enabling said biasing means to spread said screens away from said filter cake and releasing the latter from the element.

13. An apparatus as defined in claim 10 wherein each of said elements is provided with an outwardly projecting spur, said control means including at least one actuator engageable with said spur at a first station for withdrawing the element from said vessel, and stationary ramp means engageable by said spur for maintaining said element withdrawn on its way to a second station at which said spur is released for reimmersion of the element into said vessel.

14. An apparatus as defined in claim 13 wherein said fluid-circulation means comprises first suction means for drawing said liquid through the screen of an immersed element, second suction means for drawing a stream of drying air through said screen upon withdrawal of said element from said vessel, blower means for driving air in the reverse direction through said screen at a location remote from said one compartment whereby accumulated filter cake is dislodged from said screen, and distributor means for making said first suction means, second suction means and blower means successively effective.

15. An apparatus as defined in claim 14 wherein said ramp means is provided with camming formations engageable with said spur at said remote location for helping dislodge said filter cake by jolting said element.

16. An apparatus as defined in claim 10, further comprising cam means adjacent said mount engageable with each element in said region for jolting the screen thereof to promote dislodgment of adhering filter cake.

17. An apparatus as defined in claim 10 wherein said first and second positions of each element are substantially 180° apart, further comprising a receptacle positioned outside said mount in said region for receiving detached filter cake from the screens of withdrawn elements passing thereover.

18. An apparatus for the filtering of fluids, comprising a bowl-shaped vessel, partition means in said vessel dividing the interior thereof into a plurality of sectoral compartments including at least one compartment for holding a liquid to be filtered, an annular mount surrounding said vessel, an array of filtering elements having the shape of substantially flat vertical vanes pivotally supported on said mount at closely spaced locations about the periphery of said vessel, drive means for progressively rotating said mount with said elements about said vessel, said elements being individually swingable in substantially radial planes of said vessel between a first position of immersion in said vessel and a second position withdrawn from said vessel, control means for maintaining each element in said first position at least along said one compartment and for withdrawing each element into said second position at least in the region of said partition means, each of said elements being provided with at least one filter screen and a chamber into which liquid from said vessel can enter by way of said screen upon immersion in said one compartment, and fluid-circulation means commuunicating with the chamber of each element in at least certain positions thereof for removing the treated liquid therefrom.

19. An apparatus as defined in claim 18, further comprising pressure-reversing means in said fluid-circulation means for assisting in the dislodgment of filter cake from the screen of a withdrawn element at a location remote from said one compartment, another of said compartments at said location being adapted to receive the dislodged filter cake.

20. In filtering apparatus comprising an upwardly open vessel adapted to contain a liquid to be filtered, at least one hollow filtering element, mechanism for alternately immersing said element in said liquid and withdrawing said element from said vessel, and fluid-circulation means for developing a pressure differential between the interior of said element and its surroundings upon immersion of said element and for reducing said differential upon withdrawal of said element, the improvement whereby said element consists of two complementary and separable pan-shaped portions with confronting concave sides spanned by respective filter screens and forming two chambers having connections leading to said fluid-circulation means, said element being provided with biasing means tending to separate said portions whereby a space is created between said screens for the accumulation of filter cake, said fluid-circulation means being adapted to overcome the force of said biasing means by said pressure differential, upon the insulation of said chambers from the surrounding atmosphere by the buildup of the filter cake, for squeezing said filter cake between said screens.

References Cited by the Examiner
UNITED STATES PATENTS

| | | | |
|---|---|---|---|
| 2,326,484 | 8/1943 | Moreton | 210—138 X |
| 2,711,251 | 6/1955 | Spinetta | 210—318 |
| 2,849,121 | 8/1958 | Burwell | 210—328 X |
| 3,056,504 | 10/1962 | Lavellée | 210—328 |

REUBEN FRIEDMAN, *Primary Examiner.*

F. SPEAR, *Assistant Examiner.*